Dec. 22, 1931.  N. J. HOLMES ET AL  1,837,774
RESILIENT WHEEL
Filed April 29, 1930   2 Sheets-Sheet 1

INVENTORS
N.J. HOLMES
C. TAYLOR

Dec. 22, 1931.   N. J. HOLMES ET AL   1,837,774
RESILIENT WHEEL
Filed April 29, 1930   2 Sheets-Sheet 2

INVENTORS
N.J. HOLMES
C. TAYLOR

Patented Dec. 22, 1931

1,837,774

UNITED STATES PATENT OFFICE

NICHOLAS JOHN HOLMES, OF MOONEE PONDS, AND CHARLES TAYLOR, OF ALBERT PARK, VICTORIA, AUSTRALIA

RESILIENT WHEEL

Application filed April 29, 1930, Serial No. 448,332, and in Australia May 15, 1929.

This invention relates to an improved resilient wheel intended principally for use with motor-vehicles, but usable also on other road vehicles.

The object of the invention is to provide a resilient wheel of non-puncturable character embodying an internal inflated tube so positioned as to be adequately protected against puncture, but yet capable of having unrestricted cushioning action for the satisfactory absorption of road shocks.

The improved wheel consists basically of an outer rim member having a solid rubber or like tread, an inner member concentrically spaced from the outer rim and supported rigidly from the wheel hub, and an inflated tube housed within the space between the rim and the inner member and so supported as to be capable of cushioning action during the movement of the outer rim relatively to the said inner member. Means are provided for effectively enclosing and protecting the inflated tube, and means are also employed for supporting the outer rim from the inner wheel member in such a manner as to enable the former to have free slidable movement in relation thereto.

In the accompanying drawings:—

Figure 1:
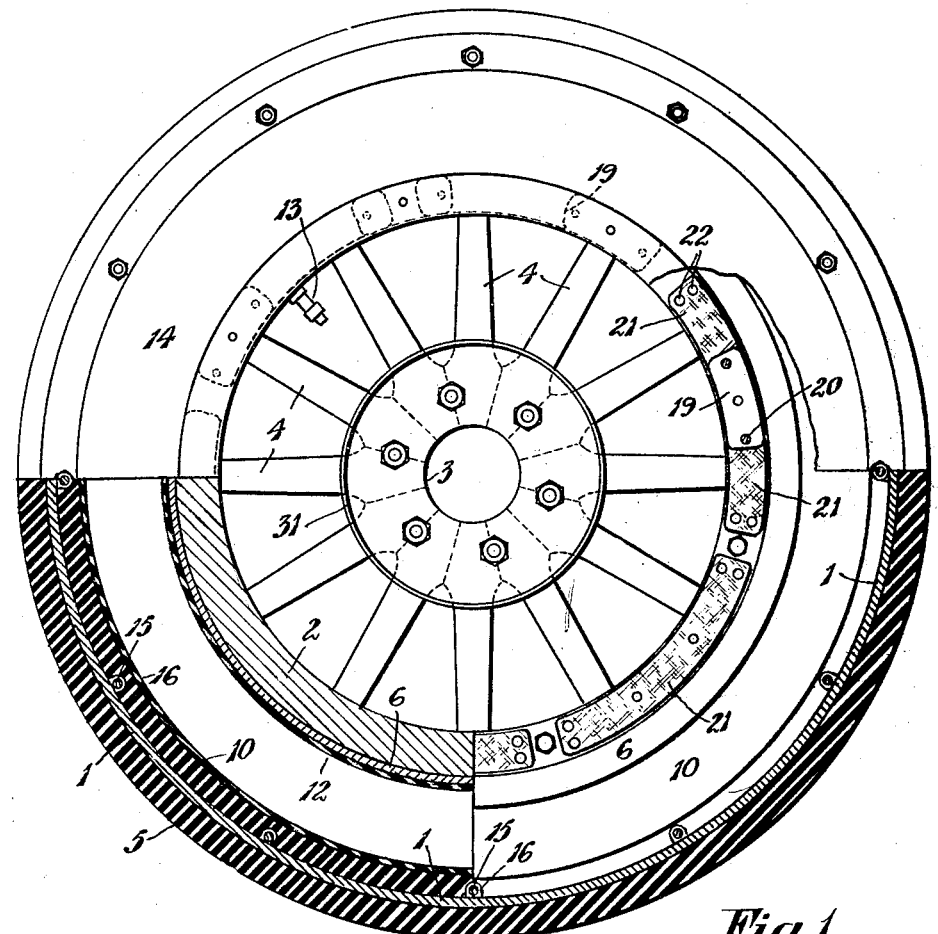
Figure 1 is a side view, partly in section, of the improved resilient wheel according to the invention.
Figure 2:
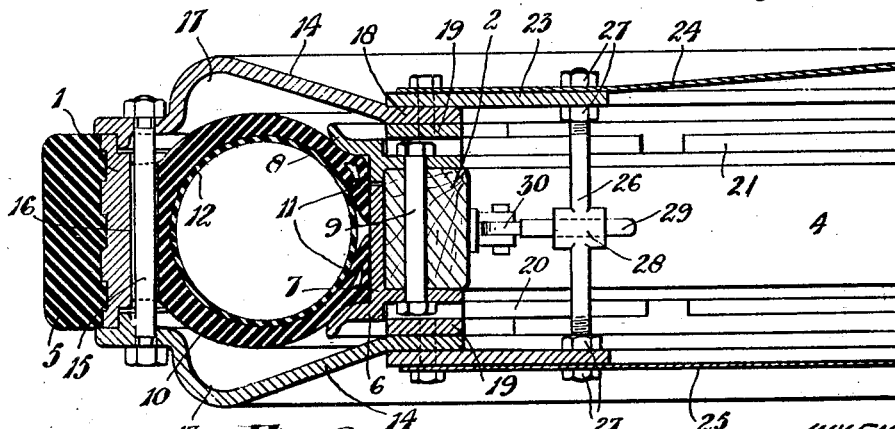
Figure 2 is a sectional view showing the internal construction of the wheel.

The improved wheel as herein illustrated comprises an outer rim 1 constructed preferably of metal, and an inner member 2 arranged concentrically within said rim 1 and appropriately spaced therefrom. The said inner member is preferably formed of wood and may be similar in construction to the felloe portion of an ordinary motor-car wheel, being rigidly connected to the wheel hub 3 by spokes 4. Alternately, a sheet metal disc may be used in lieu of the spokes to rigidly connect the inner member 2 to the wheel hub.

The outer rim 1 is fitted with a solid rubber or like tyre 5 which forms the tread surface of the wheel. The inner member 2 has a channel-shaped rim 6 consisting of a fixed section 7 and a detachable section 8 secured together by bolts 9 passing transversely through the wheel member 2.

Fitted in the space between the wheel member 2 and the outer rim 1 is a rubber tyre cover 10 having on its edges straight sided beads or the like 11 to detachably fit into the channel-shaped rim 6. A rubber tyre tube 12, inflatable through a valve 13, is accommodated within the cover 10 and thus forms a resilient cushion between the outer rim 1 and the inner member 2. Said tube 12 may be of the type ordinarily used with motor-car tyres.

The tyre cover and its tube are enclosed and protected by two side plates 14 which are fitted on opposite sides of the rim member 1 and clamped thereto by means of transverse bolts 15. Suitable recesses as 16, see Figure 1, may be provided in the outer edge of the tyre cover to provide clearance for the bolts 15. Each of the side plates 14 is constructed having a bulged portion 17 to register with the outer part of the tyre space between the rim 1 and inner wheel member 2 and thus provide ample space for the lateral expansion or bulging of the inflated tube during its cushioning action in absorbing road shocks imparted to the wheel.

Figure 5:
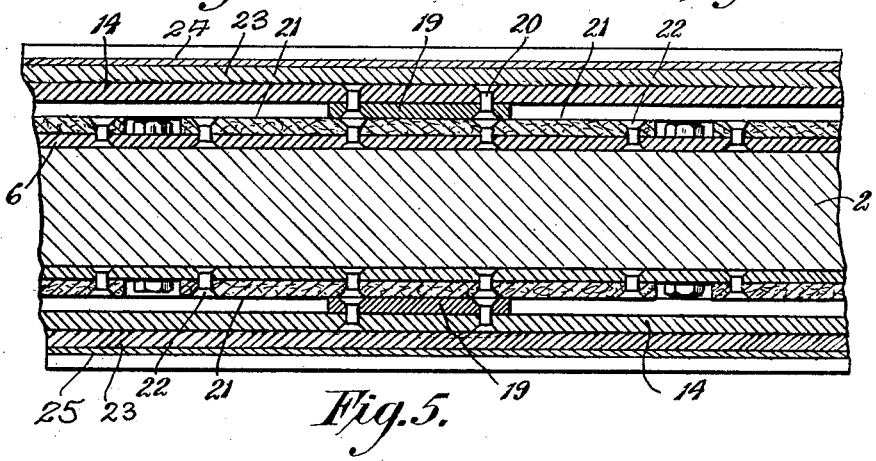
Figure 5 is a detail view in section showing the slidable connection between the outer rim and the inner member of the wheel.

The inner portion 18 of each side plate is fitted on its interior surface with a series of equally spaced metal friction plates 19 secured in position as by means of rivets 20, see Figure 5. These friction plates 19 slidably engage arcuate shaped plates 21 of asbestos or similar material secured by rivets 22 to the sides of the channel-shaped rim 6.

Secured to the outer sides of the side plates 14 are plates 23, to which sheet metal cover discs 24 and 25 are fastened. The plates 23 are connected together at spaced intervals by means of tie-bolts 26 fitted at their ends with lock-nuts 27 to enable the said plates 23 to be adjusted as desired to vary the frictional pressure between the contacting plates 19 and 21. Each of the tie-bolts 26 may have a central apertured boss 28 to slidably receive a pin 29, which is pivotally connected at 30 to the inner wheel member 2. Said pin 29 and boss 28 assist in maintaining the outer rim 1 in correctly located position in relation to the other parts of the wheel.

Figures 3, 4:
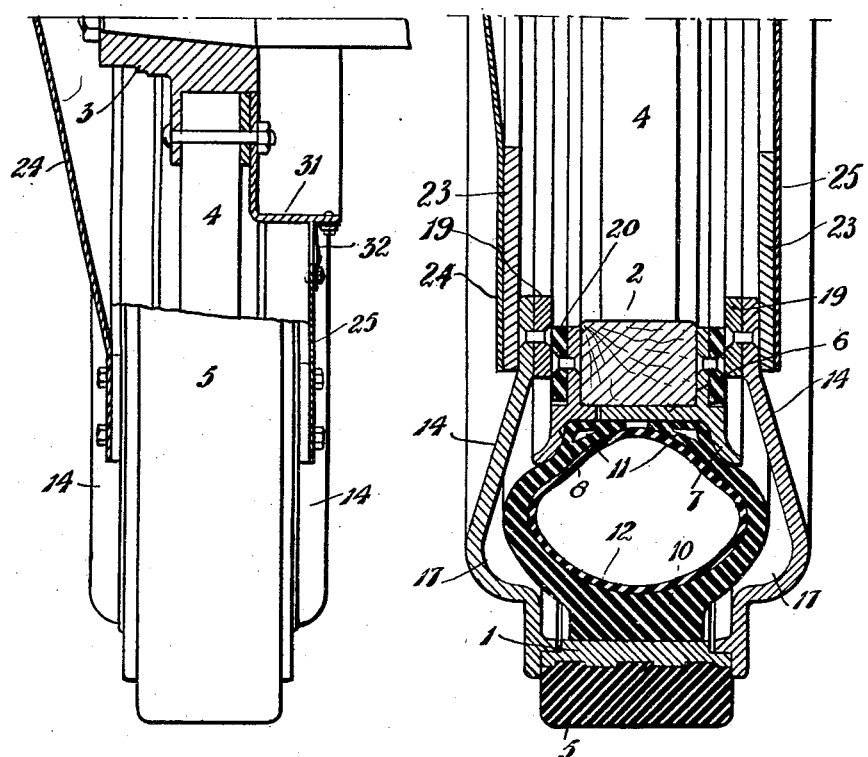
Figure 3 is a similar view showing the action of the wheel when absorbing a shock.
Figure 4 is a part sectional view showing, in particular the hub portion of the wheel.

In use, road shocks imparted to the wheel cause the outer rim 1 and parts carried thereby to move upwardly relatively to the inner wheel member 2. The inflatable rubber tube 12 in the space between said rim 1 and wheel member 2 is thus compressed, causing it to bulge or expand laterally within the bulged portions 17 of the side plates 14 as shown in Figure 3, and thereby act as a cushion to satisfactorily absorb the shocks. During the upward movement of the rim 1, the metal plates 19 slide against the asbestos friction plates 21 on the channel-shaped rim 6 and thus ensure desired freedom of movement of the parts.

By adjusting the lock-nuts 27 of the tie-bolts 26, the frictional pressure between the contacting plates 19 and 21 can be adjusted, thus enabling the action of the wheel to be assisted or retarded to vary the resiliency of the wheel. The bulged portions 17 of the side plates, in effect, form a cage for the inflated tube and tyre, and thus function to support the walls of the tyre in the event of the tyre being unduly compressed as by a heavy shock or becoming partially deflated through leakage of air.

The sheet metal discs 24 and 25 function as covers to prevent ingress of dust and rain to the friction plates 19 and 21 and other internal parts of the wheel. The inner cover disc 25 is preferably connected to the usual brake drum 31 of the wheel by means of a flexible ring 32, which effectively prevents ingress of dust while allowing the wheel to have free action.

What we do claim is:

1. In a resilient wheel of the character described, the combination of a felly, an inner rim mounted on the felly, an outer rim, a pneumatic tire interposed between the inner and outer rims, wear plates adjacent each side of the inner rim, side plates secured each side of the outer rim and extending over the wear plates on the inner rim, wear plates secured to the inner surfaces of the side plates to cooperate with the wear plates on the inner rim, dust shields fastened to the side plates, and means between the dust shields and the felly to retain the parts in relative position but permitting relative movement between the parts when the outer rim is distorted by load or load irregularities.

2. A resilient wheel as in claim 1 wherein the means between the dust shield and the felly comprises rods pivoted to the felly, and bars extending between the dust shields with guides through which the rods pass.

3. In a resilient wheel of the class described, the combination of a felly, an inner rim mounted on the felly, an outer rim, a pneumatic tire including an outer casing, mounted between the inner and outer rims, outside plates on the outer rim and extending inwardly beyond the inner rim, bolts extending between the plates through openings formed in said plates, said bolts extending through recesses formed in the outer surface of the casing, dust shields secured to the plates, and flexible means between the dust shields and the inner rim to cooperate with the bolts to retain the parts in relation under tire distortion.

In testimony whereof we affix our signatures.

N. J. HOLMES.
CHAS. TAYLOR.